United States Patent Office 3,444,053
Patented May 13, 1969

---

3,444,053
DISTILLATION OF 2-PHENYLALLYL ALCOHOL AT REDUCED PRESSURE AND IN PRESENCE OF AN INHIBITOR
Donald L. de Vries, South Holland, and Carl E. Nygren, Markham, Ill., assignors to Sinclair Research, Inc., New York, N.Y., a corporation of Delaware
No Drawing. Filed May 3, 1968, Ser. No. 726,543
Int. Cl. B01d 3/10, 3/34; C07c 29/26
U.S. Cl. 203—6    12 Claims

ABSTRACT OF THE DISCLOSURE

On distillation of 2-phenylallyl alcohol from a mixture containing 2-phenylallyl alcohol and a high boiling chlorohydrocarbon, such as a hydrolysate mixture resulting from hydrolysis of the product obtained from partial chlorination of alpha-methylstyrene, the 2-phenylallyl alcohol is isomerized and becomes contaminated with the isomerization product, 2-phenylpropionaldehyde, thereby reducing the yield of 2-phenylallyl alcohol. This isomerization is decreased and the 2-phenylallyl alcohol separated and purified by distillation from the hydrolysate mixture under reduced pressure below 760 mm. to about 20 mm. Hg, preferably below about 200 to about 100 to 20 mm. Hg, and in contact with a small, effective amount of an alkaline metal carbonate, such as sodium carbonate, potassium carbonate and the like or a trialkanolamine of higher boiling point then 2-phenylallyl alcohol, such as triethanolamine, as an isomerization inhibitor. Fractional distillation can be initially employed or the crude alcohol distilled off and then fractionally distilled, with each distillation being carried out under reduced pressure in contact with the isomerization inhibitor, usually in amount of about 0.4 to 6 or more weight percent, and preferably about 2 or 3 to 5 weight percent, based on the 2-phenylallyl alcohol being distilled.

---

This invention relates to a process for separating and purifying 2-phenylallyl alcohol by distillation from a mixture containing a high boiling chlorohydrocarbon. More particularly, this invention relates to a process for separating and purifying 2-phenylallyl alcohol by distillation from a hydrolysate resulting from hydrolysis of the product obtained from partial chlorination of alpha-methylstyrene.

2-phenylally alcohol or beta-phenylallyl alcohol can be obtained from alpha-methylstyrene by partial chlorination followed by aqueous caustic hydrolysis of the partially chlorinated product. However, the resulting crude hydrolysate contains the 2-phenylallyl alcohol in mixture with high boiling chlorohydrocarbons boiling above 200° F. at 20 mm. Hg, alpha-methylstyrene, 2-phenylpropane-1,2-diol, residual chlorides and other products. Numerous difficulties have been encountered in attempting to separate 2-phenylallyl alcohol from the crude hydrolysate. In attempting to isolate 2-phenylallyl alcohol from the hydrolysate by crystallization alone, the addition of one volume of n-pentane to lower solubility gives a homogeneous solution which when cooled to −20° C. to cause crystallization, affords yellow material which tends to retain solvent. Also about a 15% loss of 2-phenylallyl alcohol to filtrate is experienced. Furthermore, crystallization fails to remove 2-phenylpropane-1,2-diol which has a melting point of 41–44° C. Steam distillation at atmospheric pressure of 2-phenylallyl alcohol from the hydrolysate, containing 25 wt. percent 2-phenylallyl alcohol, gave only about 3% 2-phenylallyl alcohol in the overhead. This also leads to the problem of separating the alcohol from the aqueous phase.

When an attempt was made to fractionally distill the crude hydrolysate composition, containing 25 wt. percent 2-phenylallyl alcohol, at 20 mm. Hg pressure, 2-phenylpropionaldehyde was encountered in the overhead with only about 20% of the original 2-phenylallyl alcohol detectable in the overhead.

It has now been discovered that the reduction in yield of 2-phenylallyl alcohol on distillation from a mixture containing a high boiling chlorohydrocarbon is due to isomerization to 2-phenylpropionaldehyde and that this isomerization is decreased in accordance with the present invention by distilling 2-phenylallyl alcohol from the mixture under reduced pressure and in contact with a small amount of an alkaline metal carbonate, i.e. the alkali metal and alkaline earth metal carbonates, such as sodium carbonate, potassium carbonate and the like or a lower trialkanolamine of higher boiling point than 2-phenylallyl alcohol, such as triethanolamine, as an isomerization inhibitor. The distillation of 2-phenylallyl alcohol from the mixture is under a reduced pressure below 760 mm. to about 20 mm. Hg and preferably below about 200 to about 100 to 20 mm. Hg.

Only a small amount of the isomerization inhibitor sufficient to decrease or reduce isomerization of 2-phenylallyl alcohol to 2-phenylpropionaldehyde is necessary to be added to the mixture from which 2-phenylallyl alcohol is distilled. The isomerization inhibitor can be used in an amount of about 0.4 to 6% or more by weight, preferably about 2 or 2.5 to 5% by weight, based on the 2-phenylallyl alcohol in the mixture to be distilled. While more than 6% by weight isomerization inhibitor can be used, it is unnecessary and no advantage is obtained with excess amounts of isomerization inhibitor. Usually sodium carbonate or potassium carbonate or other alkaline metal carbonate in amount of about 3 to 5% or triethanolamine in amount of about 2 or 2.5 to 3%, by weight based on 2-phenylallyl alcohol can be used to minimize isomerization. The sodium and potassium carbonates, due to their low solubilities, require use as solid dispersions in the liquid mixture to be distilled. Lower concentrations of sodium or potassium carbonate than 3% can be used but are generally less effective. These carbonates have been found to be compatible with 2-phenylallyl alcohol, whereas the use of strong inorganic bases, such as sodium hydroxide, potassium hydroxide, and sodium methoxide cause degradation of 2-phenylallyl alcohol with apparent polymer formation. Pretreatment of the crude hydrolysate with ammonia at room temperature prior to distillation was unsuccessful in controlling isomerization.

The relatively high boiling point of 2-phenylallyl alcohol (248° C. at 760 mm. Hg or 133° C. at 20 mm. Hg) limits to a very large degree the readily available amine bases which can serve to inhibit isomerization since the amine base must be of higher boiling point than 2-phenylallyl alcohol to prevent contamination of the overhead alcohol. Triethanolamine is the preferred amine base for this purpose. It has the desirable characteristics of being readily available, having a particularly high boiling point (360° C. at 760 mm.), and being readily soluble in the crude hydrolysate. The triethanolamine can be introduced into the liquid mixture in the distillation zone or vessel. Since triethanolamine is soluble, it can be introduced into the stream of hydrolysate prior to entering a continuous still or it can be introduced into the upper portion of the column in a still to be in contact with the refluxing liquid and to counteract acid bodies in the column which can also contribute to isomerization in that region.

Relatively low concentrations of triethanolamine are generally used, preferably 2 or 2.5 to 3 weight percent based on 2-phenylallyl alcohol when charged with the hydrolysate to the still. However, lower concentrations down to 0.4 weight percent can be used but are less effective. Other nitrogeneous bases with sufficiently high boiling point, stability and solubility in the mixture, particularly trialkanolamines of higher boiling point than 2-phenylallyl alcohol, can be used. For example, triisopropanolamine has a boiling point (300° C. at 760 mm.) exceeding that of the alcohol but melts at 58° C. making it slightly more difficult to handle. Polyamides are commercially available but are more difficult to handle as well as having limited solubilities. Aliphatic and aromatic amines, as well as substituted pyridines and quinolines, with boiling points substantially exceeding that of 2-phenylallyl alcohol are not readily available.

Trace quantities of acid liberated during distillation are apparently sufficient to cause the isomerization of 2-phenylallyl alcohol to 2-phenylpropionaldehyde. The hydrolysate contains some residual chlorides, such as high boiling chlorohydrocarbons boiling above 200° F. at 20 mm. Hg, which are believed to give rise to hydrochloric acid capable of causing the isomerization. This theory is advanced for a better understanding of the invention and is not to be considered as limiting the process of the invention in any way.

EXAMPLE A

Alpha-methylstyrene can be partially chlorinated in any conventional manner to give 2-phenylallyl chloride. Hydrolysis of this chlorination product is carried out in a 5-gallon capacity stainless steel autoclave at about 150 to 180° C. with 6% aqueous sodium hydroxide used in 1.5 molar excess based on 2-phenylallyl chloride. Up to a 2 hour reaction time is required for essentially complete conversion of the 2-phenylallyl chloride to 2-phenylallyl alcohol. About 20 to 25% caustic in addition to that necessary for hydrolysis of 2-phenylallyl chloride to the alcohol is consumed, apparently by the higher chlorides. With essentially complete conversion of 2-phenylallyl chloride to 2-phenylallyl alcohol, the choride content in the hydrolysate, as determined by X-ray analysis, decreases to about 1.0%, with about 1.3% chloride content after 98% conversion. The hydrolysate is found to contain about 0.5% water, 12 p.p.m. iron and 1 p.p.m. nickel. A typical composition of hydrolysate is as follows:

HYDROLYSATE COMPOSITIONS

| Major components | Weight percent | B.P. at 20 mm. Hg., °F |
|---|---|---|
| Water | 0.5 | |
| Alpha-methyl styrene | 64.0 | 146 |
| 1-chloro-2-phenylpropene-1 | 1.5 | 214 |
| 2-phenylallyl chloride | 0.5 | 219 |
| 2-phenylallyl alcohol | 25.0 | 270 |
| Higher boiling components including chlorination byproducts and 2-phenylpropane-1,2-diol | 8.5 | 323 |

The following examples are illustrative of the process of this invention and include preferred embodiments thereof.

EXAMPLE I

Fractional distillation at 20 mm. Hg of a 10 gallon charge of the hydrolysate composition of Example A was carried out on a 2 inch by 6 ft. glass-helice packed column at a 10/1 reflux ratio with 2.5 weight percent triethanolamine (based on 2-phenylallyl alcohol) in solution in the hydrolysate, and afforded 2-phenylallyl alcohol in the overhead containing an average of only 0.35% 2-phenylpropionaldehyde and 0.4% alpha-methylstyrene in the alcohol plateau. Analysis for nitrogen by the Kjeldahl method showed 0.002–0.004%. The fractional distillation was carried out under reduced pressure, at 20 mm. Hg, since the resulting lower boiling point temperatures also reduce the problems of isomerization.

In contrast, when an attempt was made to fractionally distill the crude hydrolysate composition, containing 25 weight percent 2-phenylallyl alcohol, at 20 mm. Hg pressure in the absence of base, excessive isomerization of the 2-phenylallyl alcohol to 2-phenylpropionaldehyde was encountered with only about 20% of the original 2-phenylallyl alcohol being detectable in the overhead.

During fractional distillation, the water comes overhead with the initial alpha-methylstyrene. The alpha-methylstyrene is recovered for possible recycle to the chlorination reactor. 2-phenylpropionaldehyde, which apparently forms by rearrangement of the 2-phenylallyl alcohol, has a boiling point of 216° F. at 20 mm. Hg so comes overhead readily with the alcohol thus contaminating it.

EXAMPLE II

Fractional distillation at 20 mm. Hg of a 10 gallon charge of the hydrolysate composition of Example A is carried out on a 2 inch by 6 ft. glass-helice packed column at a 10/1 reflux ratio as an Example I, but with 5 weight percent of sodium carbonate as a dispersed solid in the boiling hydrolysate liquid instead of triethanolamine. The 2-phenylallyl alcohol taken overhead contained an average of 0.2% 2-phenylpropionaldehyde.

EXAMPLE III 2-phenylallyl alcohol substantially free of aldehyde and containing 0.3% chlorine by X-ray analysis was taken overhead at varied pressure (and temperature) and reflux ratios in a 4 ft. by 30 mm. glass-helice packed column with 5 weight percent anhydrous sodium carbonate based on alcohol charged. The data in the following table show that lower pressures (which permit lower temperatures) and more rapid overhead rates, which in effect lower column residence time, reduce 2-phenylpropionaldehyde in the overhead.

TABLE I.—DISTILLATION OF 2-PHENYLALLYL ALCOHOL CONTAINING 0.3% Cl BY X-RAY IN THE PRESENCE OF 5% Na₂CO₃

| Pressure, mm. Hg | Overhead temperature, °F. | Pot temperature, °F. | Percent aldehyde in overhead | |
|---|---|---|---|---|
| | | | 30/1 reflux | 10/1 reflux |
| 20 | 270 | 306 | 0.9 | Trace |
| 60 | 328 | 344 | 3.8 | 1.1 |
| 80 | 365 | 386 | 7.0 | 3.3 |

EXAMPLE IV

A number of fractional distillations of crude hydrolysate, as prepared in accordance with the general procedure of Example A, containing about 25% 2-phenylallyl alcohol, were carried out on a 4 ft. by 30 mm. glass-helice packed column using solid sodium carbonate in the pot to minimize aldehyde formation. With few exceptions, the 2-phenylallyl alcohol, in the alcohol plateau (about 270° F.), was obtained with about 0.5% down to a trace of aldehyde in the overhead at 20 mm. Hg and 10/1 reflux ratio. Increasing the pressure to 160 mm. Hg gave a minimum of 3% aldehyde in the overhead. Decreasing the overhead rate by using a 30/1 reflux ratio at 20 mm. pressure gave 0.8 to 1.3% aldehyde. The quantity of sodium carbonate which was found necessary to charge to most effectively minimize isomerization was 3 to 5 weight percent based on 2-phenylallyl alcohol.

EXAMPLE V

Crude hydrolysate, as prepared in accordance with the general procedure of Example A, was fractionated at 20 mm. Hg pressure on the 4 ft. by 30 mm. column used in Example IV with varying amounts of triethanolamine being charged to the distillation vessel. Results were comparable to those obtained using solid sodium carbonate as base. With 2 to 2.5 weight percent triethanolamine being charged based on 2-phenylallyl alcohol in the hydrolysate, there was obtained 0.07 to 0.3 weight percent 2-phenylpropionaldehyde in the overhead in the alcohol plateau. Up to 0.3% alpha-methylstyrene was also observed. The percentages of alpha-methylstyrene and aldehyde are greatest at the terminal end of the distillation. Low concentrations of chlorine, as determined by X-ray, of on the order of 0.01% were observed. Lower concentrations of triethanolamine (0.4 to 1.0 weight percent based on 2-phenylallyl alcohol) gave in excess of 1% aldehyde. Triethanolamine, as isomerization inhibitor, has advantages over sodium and potassium carbonates in that it is soluble and gives lower residual chlorides in the overhead.

The yields of 2-phenylallyl alcohol obtainable by fractional distillation with an isomerization inhibitor of this invention are increased as there is minimization of loss by isomerization to 2-phenylpropionaldehyde. A calculation of total 2-phenylallyl alcohol overhead showed yields approaching 90% based on 2-phenylallyl chloride charged for hydrolysis. Substantially complete conversion of the 2-phenylallyl chloride to the alcohol in the hydrolysis process gives a hydrolysate from which the alcohol can be fractionated with an isomerization inhibitor of this invention to give a minmum of aldehyde.

EXAMPLE VI

A purification procedure was carried out wherein the crude hydrolysate, prepared in accordance with the general procedure of Example A, was Englar distilled at 20 mm. Hg with sodium carbonate at 5% by weight based on 2-phenylallyl alcohol, followed by fractional distillation (20 mm. Hg, 5% by weight sodium carbonate) based on the crude alcohol cuts (96.5%) obtained during the initial distillation. This method serves to give relatively rapid removal of the alcohol from the chloride containing bottoms which are believed to contribute to the isomerization. By this dual purification procedure of distillation and fractional distillation of the crude alcohol, each distillation being carried out under reduced pressure in contact with an isomerization inhibitor of this invention, there was obtained 2-phenylallyl alcohol substantially free of alpha-methylstyrene and aldehyde. X-ray analysis showed only 0.02% chloride.

It is claimed:

1. Process for separating and purifying 2-phenylallyl alcohol by distillation from a mixture containing 2-phenylallyl alcohol and a high boiling chlorohydrocarbon, which comprises distilling 2-phenylallyl alcohol from the mixture under reduced pressure and in contact with an isomerization inhibitor selected from the group consisting of alkaline metal carbonates and lower trialkanolamines of higher boiling point than 2-phenylallyl alcohol, said isomerization inhibitor being present in a small amount sufficient to reduce isomerization of 2-phenylallyl alcohol to 2-phenylpropionaldehyde during distillation and thereby to improve the yield of 2-phenylallyl alcohol.

2. Process for separating and purifying 2-phenylallyl alcohol by distillation as set forth in claim 1 wherein said isomerization inhibitor is sodium carbonate in amount of about 0.4 to 6% by weight based on 2-phenylallyl alcohol.

3. Process for separating and purifying 2-phenylallyl alcohol by distillation as set forth in claim 1 wherein said isomerization inhibitor is triethanolamine in amount of about 0.4 to 6% by weight based on 2-phenylallyl alcohol.

4. Process for separating and purifying 2-phenylallyl alcohol by distillation as set forth in claim 1 wherein the distillation is carried out under reduced pressure of about 100 to 20 mm. Hg.

5. Process for separating and purifying 2-phenylallyl alcohol by distillation as set forth in claim 1 wherein said mixture is a hydrolysate resulting from hydrolysis of the product obtained from partial chlorination of alpha-methylstyrene.

6. Process for separating and purifying 2-phenylallyl alcohol by distillation as set forth in claim 5 wherein the 2-phenylallyl alcohol from said distillation is fractionally redistilled under reduced pressure and in contact with an isomerization inhibitor selected from the group consisting of alkaline metal carbonates and lower trialkanolamines of higher boiling point than 2-phenylallyl alcohol, said isomerization inhibitor being present in a small amount sufficient to reduce isomerization of 2-phenylallyl alcohol to 2-phenylpropionaldehyde during redistillation and thereby to improve the yield of 2-phenylallyl alcohol.

7. Process for separating and purifying 2-phenylallyl alcohol by distillation from a hydrolysate mixture resulting from hydrolysis of the product obtained from partial chlorination of alpha-methylstyrene, which comprises fractionally distilling 2-phenylallyl alcohol from the hydrolysate mixture under reduced pressure and in contact with an isomerization inhibitor selected from the group consisting of alkaline metal carbonates and lower trialkanolamines of higher boiling point than 2-phenylallyl alcohol, said isomerization inhibitor being present in a small amount sufficient to reduce isomerization of 2-phenylallyl alcohol to 2-phenylpropionaldehyde during distillation and thereby to improve the yield of 2-phenylallyl alcohol.

8. Process for separating and purifying 2-phenylallyl alcohol by distillation as set forth in claim 7 wherein the distillation is carried out under reduced pressure below 760 mm. to about 20 mm. Hg.

9. Process for separating and purifying 2-phenylallyl alcohol by distillation as set forth in claim 7 wherein said isomerization inhibitor is sodium carbonate in amount of about 3 to 5% by weight based on 2-phenylallyl alcohol.

10. Process for separating and purifying 2-phenylallyl alcohol by distillation as set forth in claim 9 wherein the distillation is carried out under reduced pressure of about 100 to 20 mm. Hg.

11. Process for separating and purifying 2-phenylallyl alcohol by distillation as set forth in claim 7 wherein said isomerization inhibitor is triethanolamine in amount of about 2 to 3% by weight based on 2-phenylallyl alcohol.

12. Process for separating and purifying 2-phenylallyl alcohol by distillation as set forth in claim 11 wherein the distillation is carried out under reduced pressure of about 100 to 20 mm. Hg.

References Cited

UNITED STATES PATENTS

| 1,933,064 | 10/1933 | Kyrides | 260—618 |
|---|---|---|---|
| 2,143,478 | 1/1939 | Engs et al. | 203—6 |
| 2,537,622 | 1/1951 | Butler | 260—618 |
| 2,822,409 | 2/1958 | Gwynn et al. | 203—6 |

WILBUR L. BASCOMB, JR., *Primary Examiner.*

U.S. Cl. X.R.

203—33, 38, 59, 77, 53, 91; 260—618